United States Patent Office 2,912,043
Patented Nov. 10, 1959

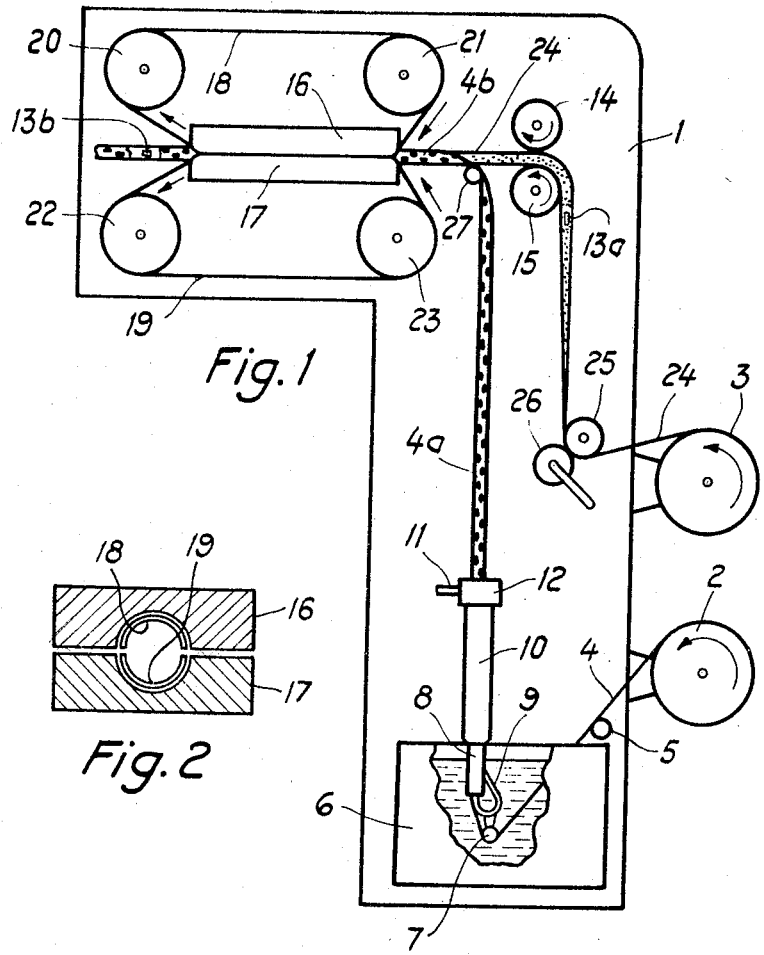

2,912,043
METHOD AND APPARATUS FOR CONTINUOUS MANUFACTURE OF COMPOSITE TUBES

Hubert Fritz Simon Bargholtz and Karl Eric Einar Lindbergh, Oljeberget, Nol, Paul Rune Schmechtig, Ejdern, Nol, and Nils Robert Ström, Nol, Sweden, assignors to Aktiebolaget Tudor, Stockholm, Sweden, a joint-stock company of Sweden Application December 14, 1954, Serial No. 475,196

Claims priority, application Sweden September 4, 1954

14 Claims. (Cl. 154—1.8)

The present invention relates to a method of manufacturing tubes of thermoplastic material by means of a stationary mandrel along which one or more tapes of the material is passed continuously while the edges of the tape or tapes are joined by pasting, welding or the like so that a tube structure is formed. The invention also relates to means for carrying out the method.

Tubes of thermoplastic material, e.g. polyvinyl chloride, are often manufactured by extrusion. As regards thin-walled tubes and tubes which are coated on the inside with a layer of other material, e.g. an inner tube in the form of a fabric or sleeve or fibrous material, this method cannot advantageously be applied, but in such case it is necessary to make the tube of thermoplastic material by forming one or more tapes into a tube structure and joining the longitudinal edges of the tape or tapes. During the joining process the tube should be located on a mandrel which determines with the required accuracy the diameter of the tube and makes it possible to subject the joint to a certain pressure during the joining procedure. Continuous manufacture of tubes according to this principle involves certain problems which form the basis of the present invention.

In order that a continuous manufacture shall be possible a stationary mandrel must be used. It has proved that the plastic forming of the tape or tapes used as material for the tube cannot be conveniently preformed on the mandrel because in plastic state the material has a tendency to adhere to the mandrel and does not withstand the strain from the necessary feeding means. In the manufacture of a composite tube with an inner tubular fabric or sleeve of fibrous material there is further the difficulty that said tubular fabric or sleeve must be applied to the stationary mandrel inside the tape or tapes of thermoplastic material and that any tensile stress on the tubular fabric or sleeve in longitudinal directions will make it contract around the mandrel and adhere thereto.

It is the object of the present invention to eliminate the abovementioned difficulties, and by the use of the method according to the invention continuous manufacture of thermoplastic tubes by folding longitudinally one or more tapes can be carried out by very simple means for the plastic forming of the tape or tapes and the feeding of the tape or tapes along the mandrel at the same time as there is opened a way of providing the tube with an interior coating or sleeve of fibrous material during the manufacturing process in a simple and efficient manner. Perforated tubes of thermoplastic material with an interior tube of glass fibres in the form of a fabric or a sleeve are used as covers for the electrode rods in certain types of so called tube plates in electric accumulators, and a machine for continuous manufacture of composite tubes for such covers will be described in the following in conjunction with the accompanying drawings, at the same time as some embodiments of the method according to the invention will be described by way of example.

Figure 1 shows schematically a machine for the manufacture of a thermoplastic tube by folding longitudinally one single tape of thermoplastic material.

Figure 2 shows in cross section the device for joining the edges of the thermoplastic tape in the machine according to Figure 1.

Figure 4 illustrates some different ways of joining the edges of the tape or tapes to make the tape or tapes form a tube.

Figure 3:
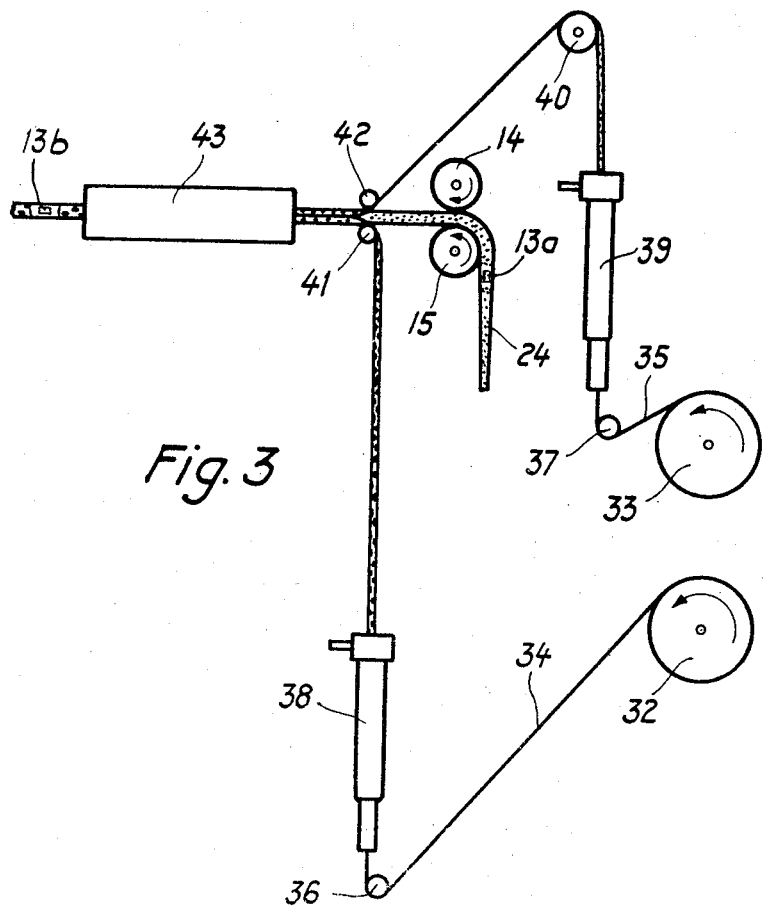
Figure 3 illustrates how the machine according to Figure 1 can be modified for the manufacture of the tube from two tapes of thermoplastic material.

In Figure 1 the frame of the machine is designated 1. Numeral 2 designates a supply reel for a perforated tape of thermoplastic material, for instance polyvinyl chloride, and 3 designates a supply reel for a woven, knitted or plaited glass fibre sleeve or hose. The perforated tape designated 4 is fed over a supporting pulley 5 down into a container 6 containing water which is maintained at a temperature of about 100° C. by heating means not shown. In the container 6 the tape 4 is bent over a guiding pulley 7 and then passes upwards through a forming die or tube 8 in which the tape is formed into a tube without the edges being joined. At the bottom end of the forming die 8 there is provided a guiding means 9 which extends by its free end into the forming die 8 and the purpose of which is to assure that the tape 4 is folded correctly in the forming die. Around the latter there is provided an outer tube 10 forming a cooling jacket, and the necessary cooling after the forming is effected by blowing air into the space between the forming die 8 and the cooling jacket 10 through a compressed air pipe connected to the nipple 11. The nipple 11 is connected to an enlarged drying cylinder 12 attached to the cooling jacket 10 and being situated above the upper end of the forming die 8. Within this cylinder the formed thermoplastic tube, designated 4a, is thus subjected to the air stream so that it is effectively dried from any remaining water.

A mandrel having ends 13a and 13b consists of a bar having circular cross section and being bent at right angles at one end. The mandrel is hidden by the material passed along it, but on the drawing parts of this material have been broken away so that ends 13a and 13b of the mandrel are visible. At end 13a the mandrel is retained in its position by resting between two pulleys 14 and 15 which are driven in opposite directions and have a concave profile coated with rubber or the like. Thus the pulley 15 serves as a stop for the mandrel. (The pulley 14 may be dispensed with.) The directions of rotation of the pulleys 14 and 15 are indicated by arrows. The main part of this mandrel is positioned between two cheeks 16 and 17 each having a semi-cylindrical groove in the surface facing the other cheek. Endless belts 18 and 19 respectively run in these grooves. As will be described more particularly below, these belts act as feeding means and are driven by driving pulleys 20—23 in the directions indicated by the arrows. The pulleys 14 and 15 and 20—23 are preferably driven by a common electric motor over suitable transmission devices so that these pulleys are accurately synchronized.

The glass wool sleeve 24 taken from the supply reel 3 is fed over a guiding pulley 25 and is slipped over the mandrel at the end 13α and is then passed between the cheeks 16 and 17. The glass wool sleeve is pressed against the pulley 25 by a pivotally mounted pressure roller 26.

The tube 4a which is formed in the forming die 8 without the edges of the tape being joined, is bent over a pulley 27 situated close to the mandrel so that the tube 4a is split open and flattened out. After having been bent over the pulley 27 the tube strives to close again due to its inherent resilience and thus encloses the mandrel and the glass wool sleeve thereon. Then the tube passes between the cheeks 16 and 17. When entering between these the tube should have closed completely, and therefore the distance between the pulley 27 and the cheeks 16—17 should be chosen sufficiently large. In order that the tube 4a shall close tightly around the mandrel, the internal diameter of the tube as determined by the forming die 8 should be a little less than the outer diameter of the mandrel with the glass wool sleeve 24 applied thereto. The width of the tape 4 should however be such that its edges will overlap each other on the mandrel to such extent that a strong overlapping joint can be obtained. At the part 4b there is a device for spreading a solvent for the plastic material on the edges of the tape. If the plastic material is polyvinyl chloride this solvent may be e.g. cyclohexanon, cyclohexanol or xylol. The device for spreading the solvent may for instance consist of a container for the solvent and wicks attached thereto which brush the edges of the tape while the tape is in flattened-out condition. For the sake of clearness this device has not been shown on the drawing. The cheeks 16 and 17 are kept pressed against the composite tube by means of spring devices not shown and are heated electrically or in other way.

When the machine is operating, the thermoplastic tube and the glass wool sleeve located therein are thus continuously carried along by the endless belts 18 and 19 whereby the tape 4 used as material for the tube is successively withdrawn from the supply reel 2 and pre-formed in the forming die 8, flattened out over the pulley 27 and applied to the mandrel at 4b enclosing the glass wool sleeve 24 which is withdrawn from the supply reel 3. Besides keeping the mandrel in its position the pulleys 14 and 15 also serve to feed the glass wool sleeve on to the mandrel so that there will be no tenseness in the glass wool sleeve along any appreciable part of the mandrel. Therefore the peripheral speed of the pulleys 14 and 15 should not be less but rather a little greater than the peripheral speed of the belts 18 and 19. The advantage of using water in the container 6 as a heat transfer medium in the pre-forming of the plastic tube lies in the fact that the temperature can easily be kept at any desired predetermined value and that the risk of overheating is eliminated. Of course, other liquids than water may be used in the heated liquid bath, and the choice of liquid is determined by the properties of the plastic material used.

When the formed composite tube passes between the cheeks 16 and 17 the solvent evaporates quickly and at the same time pressure is applied so that the edges of the tape forming the tube are effectively joined.

In Figure 2 the cheeks 16 and 17 are shown in cross section. It will also be seen from this figure how the endless belts 18 and 19 when passing between the cheeks 16 and 17 are pressed against the walls of the semi-cylindrical grooves so as to assume a semi-cylindrical cross section. For the sake of clearness the mandrel and the plastic tube with the glass wool sleeve have not been shown in Figure 2. In Figure 4a the plastic tape formed into a tube is shown in cross section.

The machine can be combined with a cutting device for cutting the tube into suitable lengths, a pasting device for spraying paste for binding the glass wool sleeve to the outer plastic tube, and other auxiliary devices which are not directly concerned with the present invention.

The described machine can be of course be modified in many ways within the scope of the invention. Thus for instance the pulley 27 for splitting open the pre-formed tube can be omitted and instead the pulley 15 can be used for this purpose in which case the pre-formed plastic tape is passed between the pulley 15 and the mandrel. It is further possible to pre-form the plastic tape in a separate operation and to wind it after the forming on to a supply reel while flattening it out so that it is in the form of a flat tape on the reel which tape when wound off folds again into a tube.

Figures 5, 6:
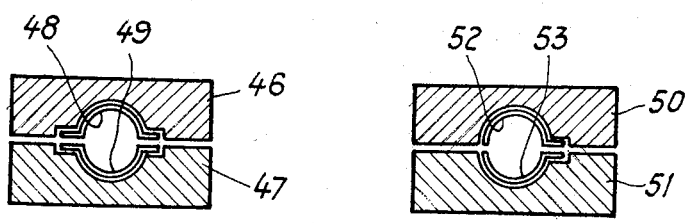
Figures 5 and 6 show in cross section two modifications of the device for joining the edges of the tape or tapes.

In Figure 3 a modified form of the apparatus is illustrated which can be used for the manufacture of a tube from two tapes of thermoplastic material in accordance with the principles of this invention. In this modification there are two supply reels 32 and 33 respectively loaded with perforated tapes of thermoplastic material. Each of these tapes which are designated 34 and 35 in the figure, is fed down into a container with a heated liquid. The containers are similar to the container 6 in Figure 1 and are not shown in Figure 3. In the containers the tapes are bent over guiding pulleys 36 and 37 respectively and then pass upwards through forming dies 38 and 39 respectively. These forming dies are similar to forming die 8 in Figure 1 and are provided with cooling and drying means corresponding to the devices 10, 11 and 12 in Figure 1. However, the forming dies 38 and 39 are shaped so as to give the tapes passing therethrough a substantially semi-circular cross section. Tape 34 formed in forming die 38 is bent over pulley 41 and applied to the mandrel from below, while tape 35 formed in forming die 39 is applied to the mandrel from above after having passed over pulleys 40 and 42. A glass wool sleeve 24 is also applied to the mandrel in the manner described in conjunction with Figure 1. The two formed tapes are flattened out when they pass over the respective pulleys but after having passed over the pulleys they strive to resume the form given by the forming dies and therefore they bend around the mandrel and the glass wool sleeve 24 applied thereto so that they form together a tube. The edges of the tapes are brushed with a solvent, and each of the edges of one tape is joined to an edge of the other tape in the pressing and heating device 43 which comprises two cheeks. These cheeks may be the same as cheeks 16 and 17 in Figures 1 and 2, but they may also be designed as shown in Figures 5 or 6 according to the desired type of joints between the tape edges. The joints between the edges of the tapes may be overlapping joints as shown in Figures 4b and 4c. However the edges of the tapes may also be folded outwards so as to form longitudinal flanges which are pressed against each other and joined as shown in Figure 4d. A combination of the said two joining methods is illustrated by Figure 4e which shows a cross section of a tube made of two tapes with one joint in the form of an overlapping joint and the other joint in the form of a flange joint.

In the case that the two tapes forming the tube are joined in the manner illustrated by Figure 4b or 4c, that is by overlapping joints, the device 43 can be designed in the same manner as the corresponding device in the machine according to Figure 1 which device is shown in cross section in Figure 2 and consist of the cheeks 16 and 17. In order that the pressure exerted by the cheeks 16 and 17 shall act upon the joints, the cheeks should preferably be arranged so that the joints will be located at the bottom of the semicylindrical grooves in the cheeks. This means that in the machine according to Figure 3 the cheeks should be arranged so that their abutting surfaces are in a vertical plane, while in the machine according to Figure 1 the cheeks are arranged so that their abutting surfaces are in a horizontal plane.

If the two tapes 34 and 35 are to be joined into a tube in the manner illustrated by Figure 4d or Figure 4e, that is by flange joints or by one flange joint and one overlapping joint, the device 43 may be designed in the manner shown in Figure 5 and Figure 6 respectively. In this case also the device 43 consists of two cheeks, 46 and 47 in Figure 5 and 52 and 53 in Figure 6 respectively, which differ from the cheeks 16 and 17 by being provided with recesses for accommodating the flanges on the plastic tapes as will be seen from Figures 5 and 6. The endless belts, 48 and 49 in Figure 5 and 52 and 53 in Figure 6 respectively which serve to feed the tapes along the mandrel, in this case have such a width that they extend by their edges into the said recesses as shown in Figures 5 and 6. The cheeks 46—47 and 50—51 respectively should of course be arranged so that their abutting surfaces are in a horizontal plane of the two plastic tapes are fed on to the mandrel in the manner shown in Figure 3, so that the pressure from the cheeks will be directed substantially at right angles to the joined surfaces of the flange joints or joint respectively.

The device shown in Figure 6 can also be used in the machine according to Figure 1 instead of the cheeks 16 and 17, namely in the case that it is desired to join the edges of the single tape 4 by a flange joint instead of an overlapping joint. The forming die 8 should then be so shaped that the edges of the tape are bent outwards when the tape is formed into a tube. The edges thus bent out are pressed against each other and joined in the recesses provided for this purpose in the cheeks 50 and 51 (Figure 6) and form together a longitudinal flange on the finished tube.

If the device according to Figure 6 is used for joining two tapes in the manner shown in Figure 4e, that is if one joint is a flange joint while the other one is an overlapping joint, the pressure between the cheeks 50 and 51 will obviously not act directly on the tape edges in the overlapping joint. It may be desirable that the pressure on the tape edges in the overlapping joint be about as great as the pressure on the tape edges in the flange joint, and in such case the device according to Figure 6 may be replaced with a device consisting of three cheeks two of which are arranged to act upon the flange joint in similar manner as the cheeks 50 and 51 in Figure 6, while the third cheek is arranged so that the pressure exerted thereby is directed towards the overlapping joint and substantially at right angles to the direction of pressure of the two other cheeks.

The forming dies 38 and 39 in Figure 3 are provided with slots or the like the shape of which corresponds to the desired cross section of the plastic tapes, so that on the whole the latter will assume their final form when passing through the forming dies with the attached cooling and drying means. During the passage over the guide pulleys the tapes are flattened out but due to their inherent elasticity they resume the shape given by the forming dies when they are applied to the mandrel.

The machine according to Figure 3 can also be modified so that the two tapes are passed through one and the same heating bath in which case the two forming dies 38 and 39 should be placed adjacent to each other. Then it is also possible to substitute one single die for the dies 38 and 39. This single die may have two separate outlet openings, one for each tape, or one single outlet opening through which both tapes are passed.

It is also possible within the scope of the invention to make the thermoplastic tube of more than two tapes. The invention can further be varied and modified in many other ways without departing from the inventive idea.

Having now particularly described and ascertained the nature of our said invention and in what manner the same is to be performed we declare that what we claim is:

1. A method for manufacturing tubes of thermoplastic material enclosing an inner layer of material with the aid of a stationary mandrel along which a tape of the thermoplastic material is passed while the longitudinal edges of the tape are secured thereby forming a tube from the tape, comprising the steps of: heating the tape to soften the tape material to render it pliable; curving the tape while pliable to cause it to assume a curved cross section; cooling the tape while having said curved cross section to produce a preformed curved tape having inherent resilience; applying an inner layer of material on said stationary mandrel; and opening the curved tape cross section toward a flattened out condition while applying the tape to said stationary mandrel over said inner layer, the tape subsequently closing around said inner layer on the stationary mandrel due to said inherent resilience.

2. The method as defined in claim 1 wherein the step of opening the tape comprises bending the tape about an axis perpendicular to a plane defined by the intersection of two lines lying along the path of the tape movement on the mandrel and the path of the tape movement toward the mandrel to permit the tape to be applied at a position intermediate the ends of the stationary mandrel.

3. In a method of manufacturing tubes of thermoplastic material enclosing an inner layer of material with the aid of a stationary mandrel along which two tapes of thermoplastic material are passed while the longitudinal edges of one tape are secured to the longitudinal edges of the other tape thereby forming a tube from the tapes, comprising the steps of: heating both tapes to soften the tape material and render it pliable; curving each of said tapes while pliable to cause each tape to assume a curved cross section; cooling the tapes while having the curved cross section to produce preformed curved tapes having inherent resilience; applying an inner layer of material on the stationary mandrel; opening the curved tape cross sections toward a flattened out condition while applying the tapes to said stationary mandrel over said inner layer, the tapes subsequently closing around said inner layer on the stationary mandrel due to said inherent resilience; and heating said tapes to seal together adjacent edges to thereby form a closed tube.

4. A method for manufacturing a double-walled tube comprising the steps of: heating a tape of thermoplastic material to soften the tape material to render it pliable; curving the tape while pliable to cause it to assume a curved cross section; cooling the tape while having said curved cross section to produce a preformed curved tape having inherent resilience; guiding a sleeve of material over one end of and along a fixed mandrel; and opening the curved tape cross section toward a flattened out condition while applying the tape at a position between the ends of said stationary mandrel over said sleeve, the tape subsequently closing around said sleeve due to said inherent resilience.

5. A method for manufacturing a double-walled tube comprising the steps of: heating a tape of thermoplastic material to soften the tape material to render it pliable; curving the tape while pliable to cause it to assume a curved cross section; cooling the tape while having said curved cross section to produce a preformed curved tape having inherent resilience; guiding a sleeve of material over one end of and along a fixed mandrel; opening the curved tape cross section toward a flattened out condition while applying the tape at a position between the ends of said stationary mandrel over said sleeve, the tape subsequently closing around said sleeve due to said inherent resilience; driving said tape and sleeve at a first velocity through a heating station to seal the longitudinal edges of the tape to form an enclosed outer tube surrounding said sleeve; and driving said sleeve on said mandrel at a position between said one end and the position where the tape of thermoplastic material is applied, at a velocity at least as great as said first velocity to prevent said sleeve from contracting and adhering to the mandrel.

6. In a method of forming a tube of thermoplastic material around an inner sleeve of a fabric material on a stationary mandrel, the steps comprising: guiding the sleeve of fabric material over one end of said mandrel; applying a tape of thermoplastic material having a curved cross section longitudinally to the sleeve at a position adjacent said one end of the mandrel; driving said tape and sleeve at a first velocity through a heating station to seal the longitudinal edges of the tape to form an enclosed outer tube surrounding said sleeve; and driving said sleeve on said mandrel at a position between said one end and the position where the tape of thermoplastic material is applied, at a velocity at least as great as said first velocity to prevent said sleeve from contracting and adhering to the mandrel.

7. In combination, a container for a heated liquid bath at a first station, forming means associated with said container for forming a tape to have a curved cross section, means for supplying a flat tape of thermoplastic material to be heated by the liquid in said container, a stationary mandrel at a second station spaced from said first station, means for supplying a collapsible fabric tube to said stationary mandrel, means for guiding said thermoplastic material after passing said forming means to said stationary mandrel and to open the curved cross section of the thermoplastic material as the thermoplastic material passes on said stationary mandrel to cover said fabric tube, means for feeding the tape continuously through said container, the forming means and along said stationary mandrel in the order stated, and means for sealing the thermoplastic material to form a closed tube as the thermoplastic material passes along said stationary mandrel.

8. The combination as defined in claim 7 wherein the longitudinal axis of said forming means is angularly related to the longitudinal axis of said stationary mandrel in the region where the thermoplastic material passes on said stationary mandrel and wherein said guiding means causes the thermoplastic material in tubular form to bend about an axis perpendicular to the longitudinal axis of said stationary material for opening and flattening out the cross section of said tape material as it passes on said stationary mandrel.

9. The combination as defined in claim 7 wherein the means for feeding the tape comprises endless belts resting against the formed tape of thermoplastic material along a substantial part of the length of said stationary mandrel.

10. The combination as defined in claim 9 including cheeks for pressing the endless belts against the formed tape of thermoplastic material, and further including means for heating said cheeks for applying heat to the tape for a purpose of sealing the longitudinal edges of the tape to each other.

11. In apparatus for forming a composite tube having an outer layer of thermoplastic material around an inner layer of material; a stationary mandrel; means for supplying the inner layer of material to said stationary mandrel; means for supplying said thermoplastic material to said stationary mandrel, said thermoplastic material being preformed to have a curved cross section; and means positioned adjacent said stationary mandrel for opening and flattening the curvature of cross section of said thermoplastic material as it is applied to the inner layer of material on said stationary mandrel.

12. The apparatus as defined in claim 11 wherein the inner layer of material is in the form of a sleeve and further having means applying the material of the inner layer over one end of said stationary mandrel while the thermoplastic material is applied at a region along the stationary mandrel intermediate the ends thereof.

13. In apparatus for forming a tube of thermoplastic material around an interior sleeve of collapsible fibrous material; a stationary mandrel having one end portion bent in angular relation to the main portion of the stationary mandrel; means for supplying the sleeve of collapsible material to said one end of the stationary mandrel; means for supplying said thermoplastic material to said stationary mandrel at a region along the main portion and spaced from the end of the stationary mandrel opposite said one end portion; means positioned at the bend of said stationary mandrel for feeding said fibrous material on said stationary mandrel, and means for feeding the thermoplastic material along the stationary mandrel with the sealing of the thermoplastic material occurring as said material moves along the stationary mandrel.

14. Apparatus for forming a closed tube of thermoplastic material on a sleeve of collapsible material comprising a mandrel having a generally circular cross section; means for applying said sleeve of collapsible material over one end of said mandrel; a die; heating means associated with said die for heating tapes of said thermoplastic material; said die having a smaller diameter than the diameter of said mandrel to form the tape into a resilient strip having a curved cross section; means for bending said strip to open said curved cross section and apply said thermoplastic material over said sleeve at a position intermediate the ends of said mandrel; and means for heating the thermoplastic material while on said mandrel to form a sealed tube enclosing said sleeve of collapsible material.

References Cited in the file of this patent

UNITED STATES PATENTS

| | | |
|---|---|---|
| 1,271,370 | Roessling | July 2, 1918 |
| 2,091,517 | Molins et al. | Aug. 31, 1937 |
| 2,140,213 | Tegarty | Dec. 13, 1938 |
| 2,145,636 | Scharf | Jan. 31, 1939 |
| 2,257,823 | Stokes | Oct. 7, 1941 |
| 2,372,645 | Barmack | Apr. 3, 1945 |
| 2,422,188 | Epstein | June 17, 1947 |
| 2,445,703 | Williams | July 20, 1948 |